US 9,987,913 B2

(12) United States Patent
Hara et al.

(10) Patent No.: US 9,987,913 B2
(45) Date of Patent: Jun. 5, 2018

(54) BATTERY MOUNTING STRUCTURE FOR VEHICLE

(71) Applicant: TOYOTA JIDOSHA KABUSHIKI KAISHA, Aichi (JP)

(72) Inventors: Yasuhiro Hara, Odawara (JP); Seigo Fujishima, Miyoshi (JP); Masayoshi Ishikawa, Susono (JP); Masayuki Kitaura, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days. days.

(21) Appl. No.: 15/488,142

(22) Filed: Apr. 14, 2017

(65) Prior Publication Data
US 2017/0305251 A1 Oct. 26, 2017

(30) Foreign Application Priority Data
Apr. 21, 2016 (JP) ................................ 2016-085566

(51) Int. Cl.
| | |
|---|---|
| *B60R 16/04* | (2006.01) |
| *B60K 1/04* | (2006.01) |
| *B60L 11/18* | (2006.01) |
| *B62D 25/20* | (2006.01) |
| *H01M 2/10* | (2006.01) |

(52) U.S. Cl.
CPC ............ *B60K 1/04* (2013.01); *B60L 11/1877* (2013.01); *B62D 25/20* (2013.01); *H01M 2/1077* (2013.01); *H01M 2/1083* (2013.01); *B60K 2001/0438* (2013.01); *B60Y 2306/01* (2013.01); *H01M 2220/20* (2013.01); *H01M 2300/0065* (2013.01)

(58) Field of Classification Search
CPC ............ H01M 2/1094; H01M 2/1083; H01M 2/1077; H01M 2/1072; H01M 2/10; H01M 2/08; H01M 2/00; H01M 2/1016; H01M 2300/0065; H01M 2220/20
See application file for complete search history.

(56) References Cited

U.S. PATENT DOCUMENTS

| | | | | |
|---|---|---|---|---|
| 5,681,057 | A * | 10/1997 | Whirley | ................... B60K 1/04 180/68.5 |
| 8,012,620 | B2 * | 9/2011 | Takasaki | .................. B60K 1/04 429/100 |
| 8,833,839 | B2 * | 9/2014 | Young | .................. B62D 21/157 296/187.08 |
| 8,939,246 | B2 * | 1/2015 | Yamaguchi | .............. B60K 1/04 180/311 |

(Continued)

FOREIGN PATENT DOCUMENTS

JP 2015-123801 A 7/2015

*Primary Examiner* — James M Dolak
(74) *Attorney, Agent, or Firm* — Hauptman Ham, LLP (57) ABSTRACT

A battery mounting structure in which a battery pack is used as a reinforcement member is provided. An inner sidewall and an outer sidewall of a frame member are connected through a first transmission member. An outer side end of the first transmission member is situated at a level out of the height range of the battery. An inner side end of the first transmission member is attached to the inner sidewall at a level within the height range of the battery, or at a level predetermined distance away from the height range of the battery. A distance between the inner side end and the battery is shorter than that between the outer side end and the battery.

5 Claims, 6 Drawing Sheets

(56) References Cited

U.S. PATENT DOCUMENTS

| | | | | |
|---|---|---|---|---|
| 9,034,502 B2 * | 5/2015 | Kano | ............ | B60K 1/04 |
| | | | | 429/99 |
| 9,533,600 B1 * | 1/2017 | Schwab | ............ | B60L 11/1879 |
| 9,694,854 B2 * | 7/2017 | Nusier | ............ | B62D 21/157 |
| 9,796,424 B2 * | 10/2017 | Sakaguchi | ............ | B62D 21/03 |
| 9,809,100 B2 * | 11/2017 | Kamimura | ............ | B60K 1/04 |
| 9,809,101 B2 * | 11/2017 | Ikeda | ............ | B60K 1/04 |
| 2016/0311301 A1 | 10/2016 | Ikeda et al. | | |

\* cited by examiner

BATTERY MOUNTING STRUCTURE FOR VEHICLE

CROSS REFERENCE TO RELATED APPLICATIONS

The present application claims the benefit of priority to Japanese Patent Application No. 2016-085566 filed on Apr. 21, 2016 with the Japanese Patent Office, the entire contents of which are incorporated herein by reference in its entirety.

BACKGROUND

Field of the Disclosure

Embodiments of the present application relate to the art of a structure for mounting a battery in the lower level of the vehicle.

Discussion of the Related Art

JP-A-2015-123801 describes a vehicle battery mounting structure in which a battery (fuel cell stack) is arranged underneath a floor panel. According to the teachings of JP-A-2015-128801, the battery is supported by a battery frame from below, and the battery frame is made of resin to absorb a collision impact applied from the side of the vehicle. A length of the battery frame in the width direction of the vehicle is longer than that of the battery, and an energy absorption member is provided at a vehicle body lower side of a floor panel.

Thus, according to the teachings of JP-A-2015-123801, the battery can be prevented from being subjected to the impact applied from the side of the vehicle. However, although the energy absorption member and the battery frame are effective to absorb the impact, the battery is not used as a reinforce member to enhance rigidity of a vehicle body. That is, although rigidity of the battery of this kind is rather high, the battery is protected from the impact by the battery frame and hence does not serve as a reinforce member to enhance rigidity of the vehicle body.

SUMMARY

Aspects of the present disclosure have been conceived noting the foregoing technical problems, and it is therefore an object of the present disclosure is to provide a battery mounting structure in which a battery pack is used as a reinforcement member to enhance rigidity of a vehicle body.

Embodiments of the present disclosure relate to a battery mounting structure for a vehicle, comprising a pair of hollow frame members extending in a longitudinal direction of the vehicle, and battery pack including an all-solid battery having a solid electrolyte that is disposed between the frame members. Each of the frame members includes an inner sidewall and an outer sidewall opposed to each other. The inner sidewall is partially overlapped with the battery pack in a height range, and the outer wall includes a portion extending higher than an upper end of height of the battery pack or a portion extending lower than a lower end of the battery pack. The outer sidewall is connected to the inner sidewall through a first transmission member. In order to achieve the above-explained objective, an outer side end of the first transmission member is situated at a level out of the height range of the battery pack. An inner side end of the first transmission member is attached to the inner sidewall at a level within the height range of the battery pack, or at a level predetermined distance away from the height range of the battery pack. In addition, a distance between the inner side end and the height range of the battery pack in the vertical direction is shorter than a distance between the outer side end and the height range of the battery pack in the vertical direction.

In a non-limiting embodiment, the battery pack may include a cell stack formed of a plurality of single cells, and the cell stack is disposed between the frame member in such a manner that the single cells are juxtaposed in a width direction of the vehicle.

In a non-limiting embodiment, the inner side end of the first transmission member may be situated at a level within the height range of the battery pack. The battery mounting structure may further comprise a second transmission member that transmits a load from the inner sidewall to the battery pack. An outer side end of the second transmission member may be situated at a level to be opposed to the inner side end of the first transmission member, and the inner side end of the second transmission member may situated at a level within the height range of the battery pack.

In a non-limiting embodiment, the first transmission member may be formed integrally with the frame member.

In a non-limiting embodiment, the first transmission member may be formed separately from the frame member, and the outer side end is attached to an inner surface of the outer sidewall and the inner side end is attached to an inner surface of the inner sidewall.

Thus, according to the embodiment of the present disclosure, the first transmission member is arranged in the hollow frame member. The outer side end of the first transmission member is attached to the outer sidewall at a level out of the height range of the battery pack. The inner side end of the first transmission member is attached to the inner sidewall at a level within the height range of the battery pack, or at a level predetermined distance away from the height range of the battery pack, and a distance between the inner side end and the height range of the battery pack in the vertical direction is shorter than a distance between the outer side end and the height range of the battery pack in the vertical direction. In addition, rigidity of the all-solid battery is sufficiently high. According to the embodiment, therefore, a load applied to a portion of the frame member above or below the battery from the side of the vehicle is transmitted to the battery through the first transmission member. That is, the battery may be utilized as a reinforcement member to enhance rigidity of a vehicle body against the load applied from the side.

As described, in the battery mounting structure, the cell stack of the battery pack is disposed between the frame member in such a manner that the single cells are juxtaposed in a width direction of the vehicle. For this reason, rigidity of a vehicle body against the load applied from the side may be further enhanced.

In a case that a predetermined clearance is maintained between the frame member and the battery pack, the second transmission member is interposed therebetween to transmit the load applied to the frame member to the battery pack. For this reason, rigidity of a vehicle body against the load applied from the side may be further enhanced even if the clearance is maintained between the frame member and the battery pack.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 2:
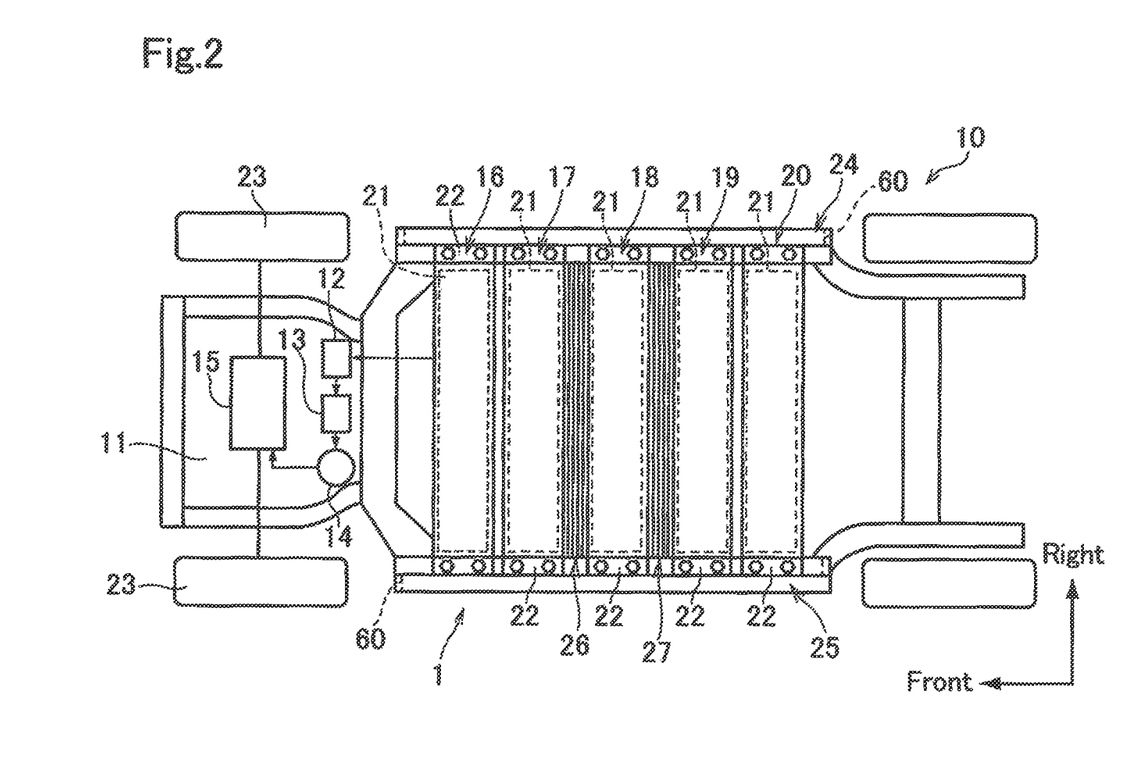
FIG. 2 is a schematic illustration showing a vehicle to which the battery mounting structure according to the present disclosure is applied.

Hereinafter, embodiments of the present disclosure will be explained with reference to the accompanying drawings. Turning now to FIG. 2, there is shown one example of a bottom structure of a vehicle 10 to which the battery mounting structure 1 according to the present disclosure is applied. In the vehicle 10 shown in FIG. 2, a converter 12, an inverter 13, a motor 14, and a power transmission unit 15 are arranged in a front compartment 11, and five sets of battery packs 16, 17, 18, 19 and 20 are juxtaposed under a floor panel. In each of the battery packs 16 to 20, a battery module 21 as a stack of single cells is held in a casing 22. The converter 12 is adapted to increase a voltage from the battery modules 21, and to apply the voltage to the inverter 13 while stabilizing. The inverter 13 converts the direct current supplied from the battery modules 21 into the alternate current while controlling frequency. The power transmission unit 15 transmits torque of the motor 14 to drive wheels 23 while increasing or decreasing. Here, the inverter 13 may also be connected directly to the battery modules 21 while omitting the converter 12.

In the vehicle 10, a right side sill 24 and a left side sill 25 as frame members extend on both sides of the vehicle 10, and the battery packs 16 to 20 are juxtaposed in the longitudinal direction of the vehicle 10 at regular intervals between the right side sill 24 and the left side sill 25. Each of the battery packs 16 to 20 has a cuboid shape, and width ends of the battery packs 16 to 20 are attached to the right side sill 24 and the left side sill 25. In the vehicle 10, those battery packs 16 to 20 serve as reinforcement members to enhance rigidity of the vehicle 10 against a collision impact or a collision load applied to the vehicle from the side. In order to further reinforce the right side sill 24 and the left side sill 25, a first floor cross member 26 and a second floor cross member 27 are disposed laterally underneath a floor panel between the right side sill 24 and the left side sill 25 while keeping a predetermined clearance therebetween in the longitudinal direction. Right ends of the first floor cross member 26 and the second floor cross member 27 are attached to intermediate portions of the right side sill 24, and left ends of the first floor cross member 26 and the second floor cross member 27 are attached to intermediate portions of the left side sill 25. Here, it is to be noted that the numbers of the battery packs may be altered arbitrarily according to need. In addition, the floor cross members may be omitted if it is unnecessary.

Figure 3:
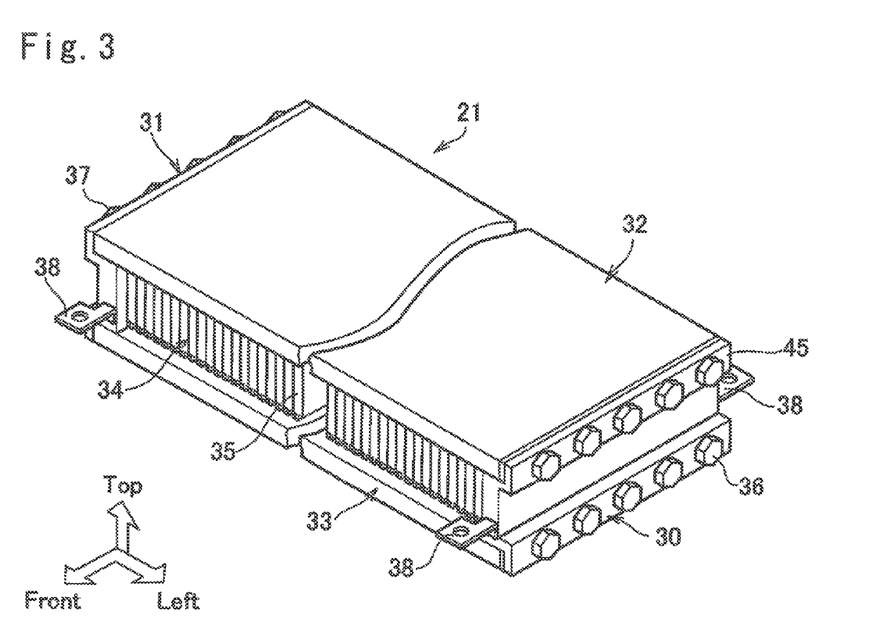
FIG. 3 is a perspective view showing the battery module.

FIG. 3 is a perspective view showing one example of the battery module 21 as an all-solid battery. As illustrated in FIG. 3, the battery module 21 comprises a first end plate 30, a second end plate 31, a first tension plate 32, a second tension plate 33, and a cell stack 34. Thus, each of the battery modules 21 has a cuboid shape, and individually arranged in the vehicle 10 in such a manner that the long sides extend in the width direction and that the first end plate 30 and the second end plate 31 extend in the longitudinal direction.

Specifically, the cell stack 34 is formed of a plurality of flat rectangular single cells 35 juxtaposed in the width direction of the vehicle 10. Although the single cells 35 are juxtaposed in the width direction of the vehicle 10, the direction to juxtapose the single cells 35 should not be limited to the specific direction.

Each of the single cell 35 includes a pair of electrodes and a solid electrolyte interposed between the electrodes (neither of which are shown). The single cells 35 forming the cell stack 34 are connected in series through a harness. The harness comprises a bundle of copper wires, and a wire insulation made of thermally and frictionally resistant resin covering the bundle of wires. The battery modules 21 outputs electrical power in accordance with the number of the single cells 35 through a pair of electrodes exposed to outside. The single cells 35 are individually connected with a battery ECU (not shown) through the harness, and the battery ECU is configured to stabilize the power output of the single cell 35 while observing voltage. Specifically, the battery ECU is attached to a front face or a rear face of the cell stack 34 in the longitudinal direction of the vehicle 10. As described, the battery packs 16 to 20 are connected in parallel with each other to achieve a required capacity to operate the motor 14.

The first end plate 30 and the second end plate 31 are made of solid material, and situated on both width ends of the cell stack 34. The first tension plate 32 is attached to the first end plate 30 and the second end plate 31 above the cell stack 34 by screwing bolts 36 and 37 into bores of the first end plate 30 and the second end plate 31. Likewise, the second tension plate 33 is attached to the first end plate 30 and the second end plate 31 below the cell stack 34 by screwing bolts 36 and 37 into bores of the first end plate 30 and the second end plate 31. Since the solid electrolyte is employed in the battery module 21, liquid spill will not occur in the battery module 21. In addition, since most of the components of the battery module 21 are made of solid material, a shock resistance of the battery module 21 may be enhanced. Accordingly, in the battery mounting structure, the first tension plate 32, the second tension plate 33, and the bolts 36 and 37 serve as a bundling member. The first end plate 30 and the second end plate 31 are individually provided with a pair of fixing plates 38 at both ends so that the battery module 21 is fixed to the casing 22 made of insulation material through the fixing plates 38.

Figure 1:
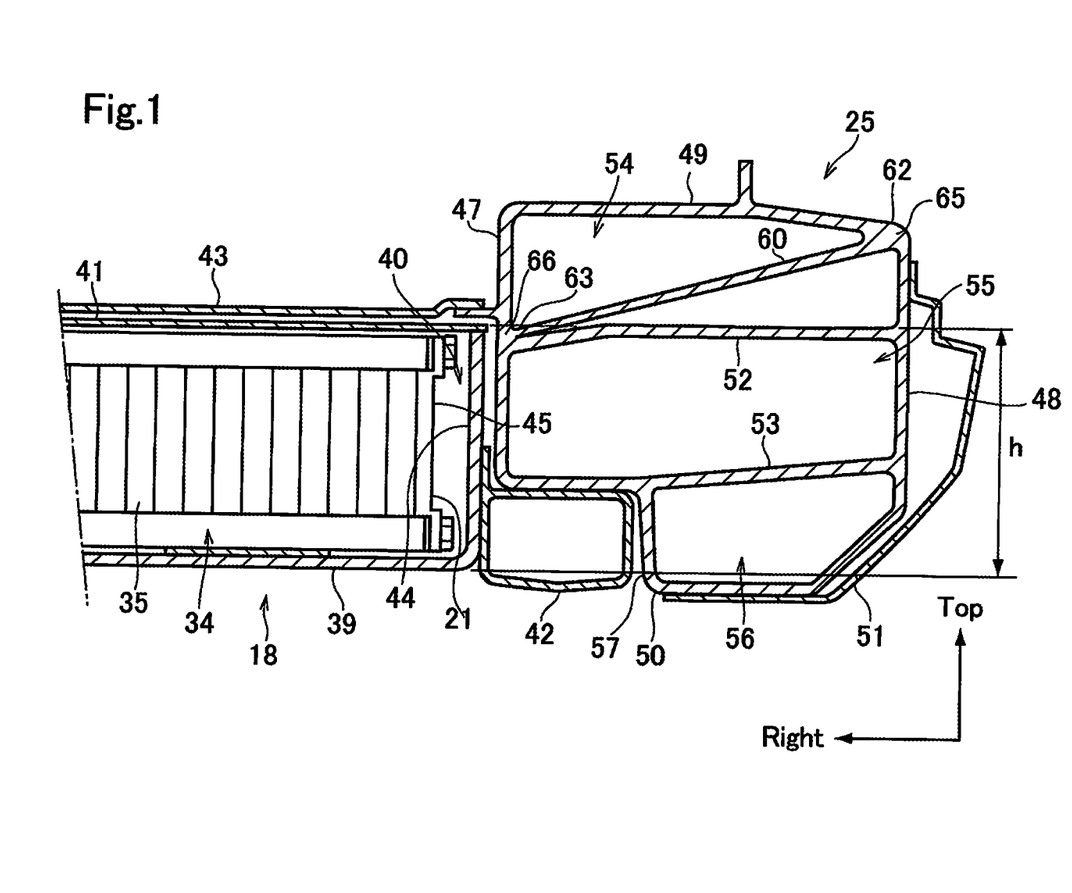
FIG. 1 is a cross-sectional view showing a first example of the battery mounting structure according to the present disclosure.

Turning to FIG. 1, there is shown a cross-section of the battery mounting structure 1 according to the first example. As illustrated in FIG. 1, the battery pack 18 includes the battery module 21, a casing 39 and a lid 41, and a reinforcement frame 42 is attached to an outer face of a sidewall of the casing 39. Specifically, the reinforcement frame 42 is a hollow frame member extending in the longitudinal direction, and attached entirely to the outer face of the sidewall 44 of the casing 39. A floor panel 43 is deposed above the lid 41 of the battery pack 18. Specifically, a right side end of the floor panel 43 is disposed on an inner flange protruding inwardly from the right side sill 24, and a left side end of the floor panel 43 is disposed on an inner flange protruding inwardly from the left side sill 25. The battery module 21 is held in a chamber 40 of the casing 39, and in the casing 39, the sidewall 44 and an outer face 45 of the first end plate 30 extend in the vertical direction substantially parallel to each other.

In order to lighten the vehicle weight while ensuring rigidity, each of the right side sill 24 and the left side sill 25 may be formed using light aluminum alloy by an extrusion method. As shown in FIG. 1, the left side sill 25 includes an inner sidewall 47 opposed to the sidewall 44, an outer sidewall 48, an upper wall 49 extending between upper ends of the inner sidewall 47 and the outer sidewall 48, and a lower wall 50 extending between lower ends of the inner sidewall 47 and the outer sidewall 48. In addition, an ornamental member 51 is attached to the outer sidewall 48 and the lower wall 50. In order to enhance rigidity of the left side sill 25, a first horizontal reinforcement plate 52 and a second horizontal reinforcement plate 53 extending longitudinally are formed between the inner sidewall 47 and the outer sidewall 48. Accordingly, the internal space of the left side sill 25 is divided into a first chamber 54, a second chamber 55 and a third chamber 56.

A lower inner corner of the left side sill 25 is depressed to form a depression 57 to be engaged with the reinforcement frame 42 connected to the casing 39, and at least an upper face of the reinforcement frame 42 is fixed to a lower face of the depression 57 by an appropriate means such as a bolt or welding. Since the left side sill 25 is thus combined with the reinforcement frame 42, rigidity of the left side sill 25 against the impact applied from the side of the vehicle 10 may be enhanced, and the impact applied to the left side sill 25 is effectively transmitted e.g., to the battery pack 18 serving as a reinforcement member. As shown in FIG. 1, the sidewall 44 of the casing 39 and the inner sidewall 47 of the left side sill 25 vertically extend parallel to each other while maintaining a predetermined clearance therebetween. The right side sill 24 is also attached to the battery packs 16 to 20 in a similar fashion.

In order to transmit the impact applied to the left side sill 25 from the left side of the vehicle 10 to the battery packs 16 to 20, a first transmission member 60 as a diagonal plate is formed in the first chamber 54 in such a manner as to connect an upper left corner (to be called the "first corner" hereinafter) 62 between the upper wall 49 and the outer sidewall 48 to a lower right corner (to be called the "second corner" hereinafter) 63 between the inner sidewall 47 and the first horizontal reinforcement plate 52. In other words, an outer side end 65 of the first transmission member 60 is connected to the first corner 62, and an inner side end 66 is connected to the second corner 63.

In FIG. 1, a height of the battery pack 18 is represented by "h". As can be seen from FIG. 1, the outer side end 65 of the first transmission member 60 is situated at a higher level than an upper end of the height "h" of the battery pack 18, and the inner side end 66 of the first transmission member 60 is situated at a substantially same level as an upper end of the sidewall 44 of the casing 39. That is, the inner side end 66 of the first transmission member 60 is situated within the height "h" of the battery pack 18. As shown in FIG. 2, a length of the first transmission member 60 is longer than a total length of side ends of the battery packs 16 to 20 (i.e., longer than a total length of the first end plates 30). Here, the first transmission member 60 may also be formed separately and arranged in the above explained position of the first chamber 54.

When a collision impact is applied to the left side sill 25 from the side of the vehicle 10, reaction forces of the first transmission member 60, the first horizontal reinforcement plate 52 and the second horizontal reinforcement plate 53 act against the impact to prevent deformation of the left side sill 25. As described, the outer side end 65 of the first transmission member 60 is situated at a level higher than the height "h" of the battery packs 16 to 20, and the inner side end 66 of the first transmission member 60 is situated a substantially same level as an upper end of the height "h" or within the height "h". In this situation, therefore, the collision impact applied to a portion of the outer sidewall 48 above the height "h" of the battery packs 16 to 20, in other words, to a portion of the outer sidewall 48 that is not supported by the battery packs 16 to 20 is received by the outer side end 65 of the first transmission member 60 and transmitted to the inner side end 66 of the first transmission member 60. That is, the portion of the left side sill 25 above the height "h" of the battery packs 16 to 20 is also supported by the battery packs 16 to 20 through the first transmission member 60. Thus, the rigidity of the left side sill 25 against the collision impact applied from the side of the vehicle 10 is enhanced by the first transmission member 60. As described, since the battery packs 16 to 20 serve as the reinforcement members, an inward deformation of the vehicle body by the collision impact can be suppressed. In addition, not only the structures of the reinforcement members against the impact applied from the side of the vehicle 10 can be simplified but also number of the reinforcement members can be reduced. For these reasons, a vehicle weight can be reduced and hence the capacity of the battery packs can be increased without increasing the vehicle weight.

Figure 4:
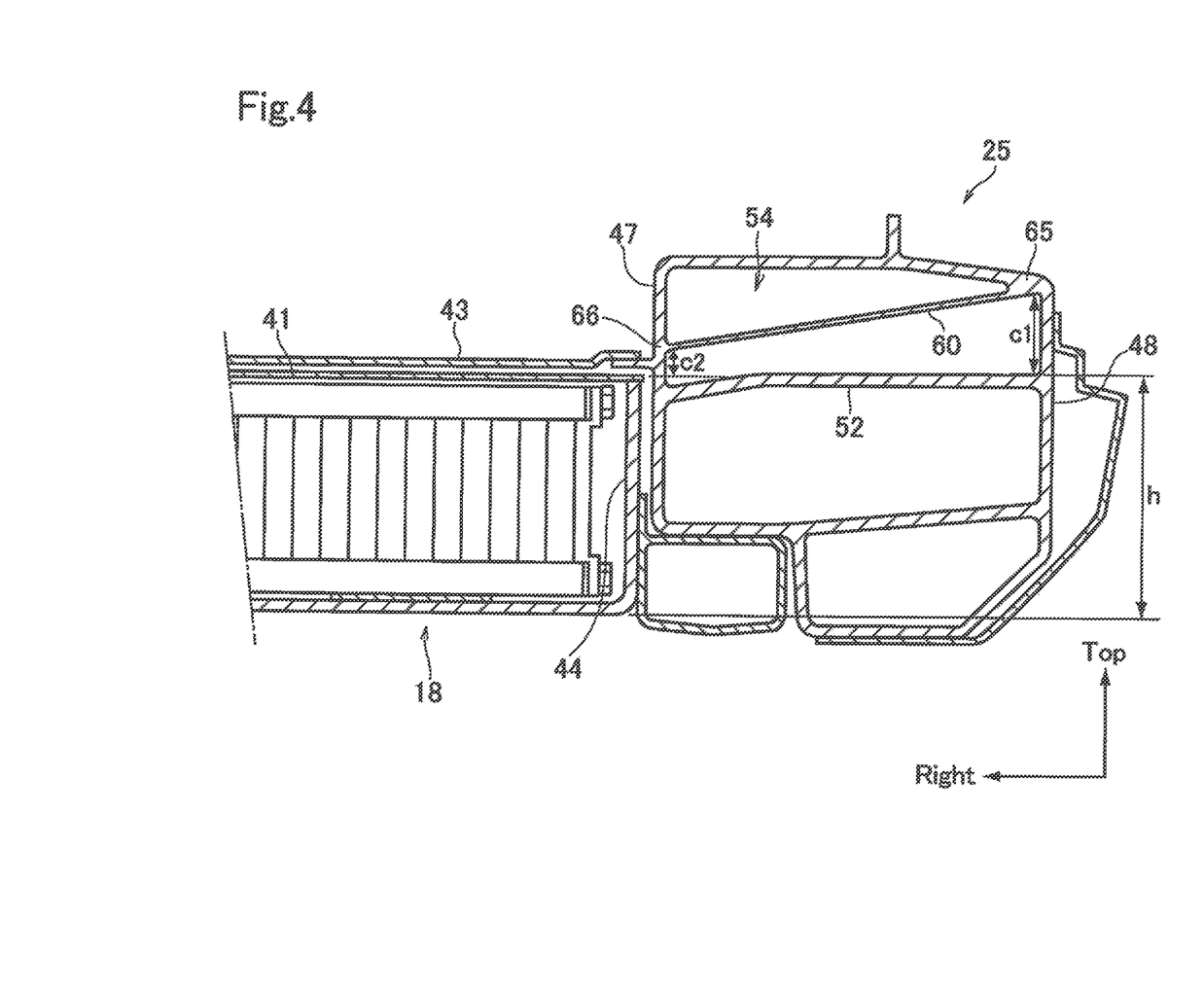
FIG. 4 is a cross-sectional view showing a second example of the battery mounting structure according to the present disclosure.

Turning to FIG. 4, there is shown a cross-section of the battery mounting structure 1 according to the second example. In the following explanations, common reference numerals are allotted to the elements in common with those in the first example, and detailed explanations for the common elements will be omitted. According to the second example, both of the outer side end 65 and the inner side end 66 of the first transmission member 60 are situated above the upper end of the battery packs 16 to 20. Specifically, the inner side end 66 of the first transmission member 60 is situated at a level between the outer side end 65 of the first transmission member 60 and the upper end of the height "h" of the battery packs 16 to 20. That is, as indicated in FIG. 4, a clearance c1 between the outer side end 65 and the first horizontal reinforcement plate 52 is wider than a clearance c2 between the inner side end 66 and the first horizontal reinforcement plate 52 (c1>c2).

Thus, according to the second example, the inner side end 66 of the first transmission member 60 is situated at the level close to the height "h" of the battery packs 16 to 20. According to the second example, therefore, the collision impact applied to the portion of the outer sidewall 48 above the height "h" of the battery packs 16 to 20 is transmitted through the first transmission member 60 to the inner sidewall 47 at a portion close to the upper end of the battery packs 16 to 20. That is, the portion of the left side sill 25 above the height "h" of the battery packs 16 to 20 may also be supported by the battery packs 16 to 20 through the first transmission member 60. Specifically, since the collision impact applied to the portion of the outer sidewall 48 above the height "h" of the battery packs 16 to 20 is transmitted to a portion in the vicinity of the lid 41 of the battery pack 18, the rigidity of the vehicle body against the collision impact applied from the side of the vehicle 10 may be further enhanced.

Figure 5:
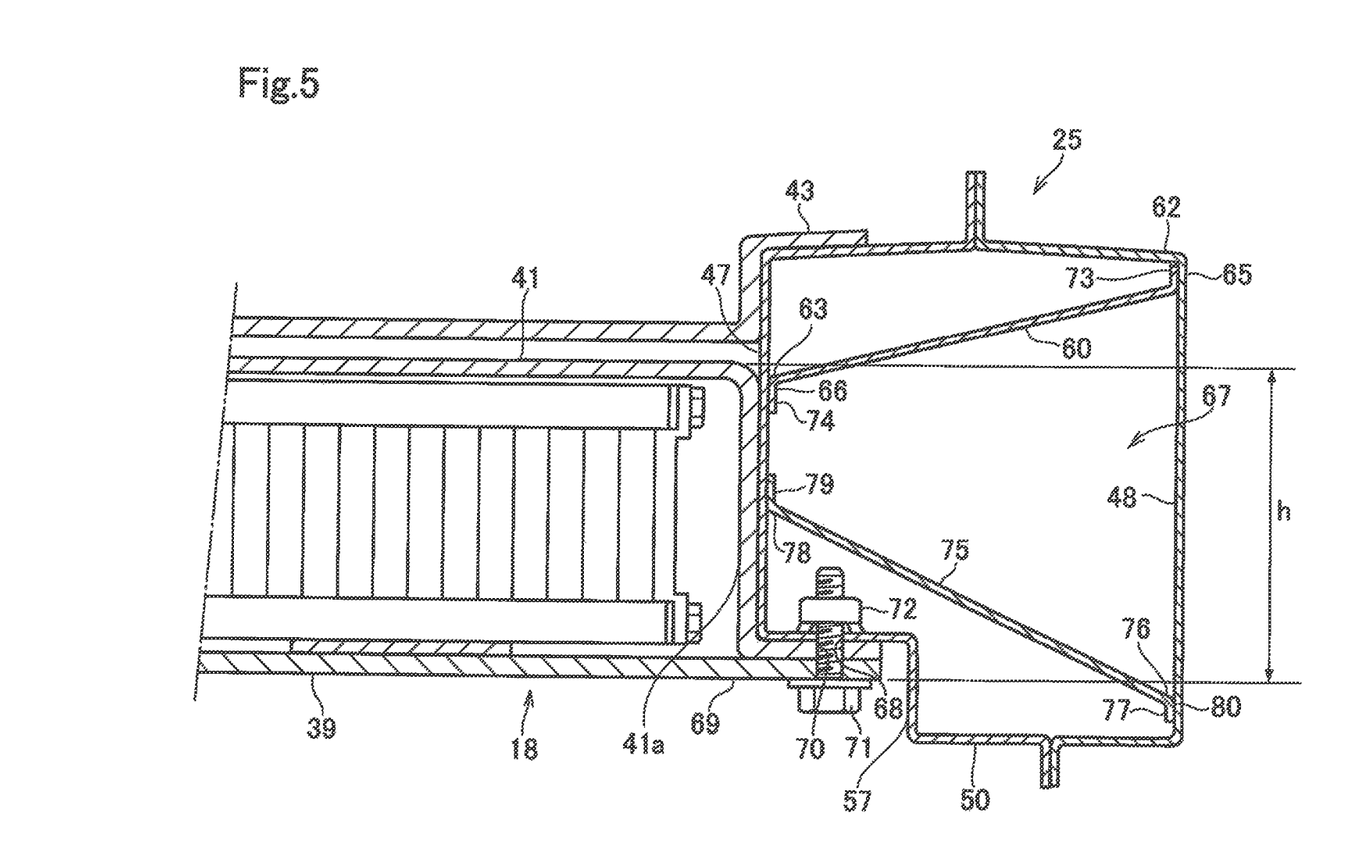
FIG. 5 is a cross-sectional view showing a third example of the battery mounting structure according to the present disclosure.

Turning to FIG. 6, there is shown a cross-section of the battery mounting structure 1 according to the third example. According to the third example, the inner sidewall 47 and the outer sidewall 48 are formed separately. The inner sidewall 47 is attached to the outer face of a sidewall 41a of the lid 41, and upper ends and lower ends of the inner sidewall 47 and the outer sidewall 48 are joined to each other by welding or bonding. According to the third example, the lower wall 50 is depressed to form the depression 57, and a leading end of the lid 41 is overlapped on a leading end of the casing 39 to form an installation portion 69. A first bore 68 is formed on the lower wall 50 in the depression 57 and a second bore 70 is formed on the installation portion 69, and a weld nut 72 is welded on an inner surface of the lower wall 50 around the first bore 68. In order to fix the left side sill 25 to the casing 39, a bolt 71 is screwed into the second bore 70, the first bore 68, and the weld nut 72.

In a chamber 67 of the left side sill 25, the lower first transmission member 75 is arranged to connect the inner sidewall 47 and the outer sidewall 48 below the first transmission member 60. According to the third example, the outer side end 65 of the first transmission member 60 is bent upwardly to form a first installation flange 73, and the inner side end 66 of the first transmission member 60 is bent downwardly to form a first installation flange 73. The first installation flange 73 is welded or bonded to the first corner 62 of the outer sidewall 48 situated above the upper end of the height "h" of the battery packs 16 to 20, and the second installation flange 74 is welded or bonded to the inner sidewall 47 at a portion in the vicinity of the upper end of the height "h" of the battery packs 16 to 20 within the height "h".

Likewise, an outer side end 76 of the lower first transmission member 75 is bent downwardly to form a third installation flange 77, and an inner side end 78 of the lower first transmission member 75 is bent upwardly to form a fourth installation flange 79. The third installation flange 77 is welded or bonded to the outer sidewall 48 in the vicinity of an outer lower corner of the left side sill 25 below a lower end of the height "h" of the battery packs 16 to 20, and the fourth installation flange 79 is welded or bonded to the inner sidewall 47 at a portion below the second installation flange 74 but within the height "h" of the battery packs 16 to 20. According to the third example, the first transmission member 60 and the lower first transmission member 75 may be formed of iron or carbon fiber reinforced plastic material (CFRP).

Thus, according to the third example, the outer side end 65 of the first transmission member 60 is situated above the upper end of the height "h" of the battery packs 16 to 20, and the inner side end 66 of the first transmission member 60 is situated within the height "h" of the battery packs 16 to 20. On the other hand, the outer side end 76 of the lower first transmission member 75 is situated below the lower end of the height "h" of the battery packs 16 to 20, and the inner side end 78 of the lower first transmission member 75 is situated within the height "h" of the battery packs 16 to 20. Here, a length of the lower first transmission member 75 is also longer than the total length of side ends of the battery packs 16 to 20 (i.e., longer than the total length of the first end plates 30).

According to the third example, not only the collision impact applied to the portion of the left side sill 25 above the battery packs 16 to 20, but also the collision impact applied to the portion of the left side sill 25 below the battery packs 16 to 20 may be transmitted to the battery packs 16 to 20. In addition, since the inner sidewall 47 of the left side sill 25 is attached to the sidewall 41a of the lid 41, the impact applied to the outer sidewall 48 can be transmitted certainly to the battery packs 16 to 20 through the first transmission member 60 and the lower first transmission member 75. That is, both of the portions of the left side sill 25 above and below the battery packs 16 to 20 may be supported by the battery packs 16 to 20 through the first transmission member 60 and the lower first transmission member 75 so that the rigidity of the vehicle body against the collision impact applied from the side of the vehicle 10 may be further enhanced.

Figure 6:
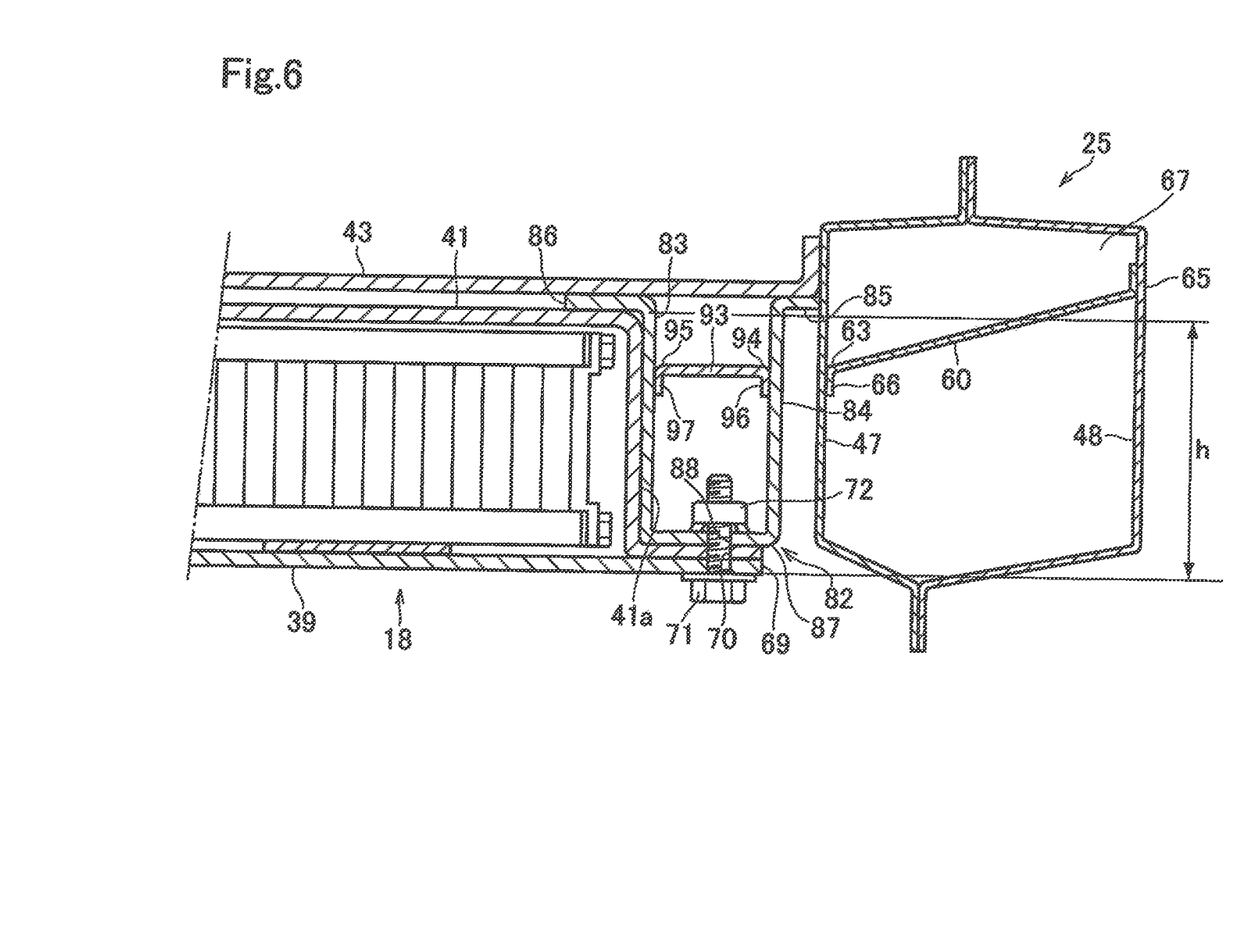
FIG. 6 is a cross-sectional view showing a fourth example of the battery mounting structure according to the present disclosure.

Turning to FIG. 6, there is shown a cross-section of the battery mounting structure 1 according to the fourth example. According to the fourth example, the inner sidewall 47 and the outer sidewall 48 are also formed separately, and upper ends and lower ends of the inner sidewall 47 and the outer sidewall 48 are joined to each other by welding or bonding. In the chamber 67 of the left side sill 25, the outer side end 65 of the first transmission member 60 is attached to the outer sidewall 48 above the upper end of the height "h" of the battery packs 16 to 20, and the inner side end 66 of the first transmission member 60 is attached to the inner sidewall 47 within the height "h" of the battery packs 16 to 20. According to the fourth example, a reinforcement member 82 is interposed between the left side sill 25 and the casing 39. Specifically, the reinforcement member 82 is a reinforcement bar member having a U-shaped cross section opening upwardly, and extends entirely between the left side sill and the battery packs 16 to 20. As illustrated in FIG. 6, the reinforcement member 82 includes an inner sidewall 83 attached to the outer face of a sidewall 41a of the lid 41, an outer sidewall 84 opposed to inner sidewall 47, a bottom wall 87 connecting the inner sidewall 83 and the outer sidewall 84, an inner installation flange 86 protruding from an upper end of the inner sidewall 83 toward the battery packs 16 to 20, and an outer installation flange 85 protruding from an upper end of the outer sidewall 84 toward the left side sill 25. The inner installation flange 86 is inserted between the floor panel 43 and the lid 41 while being welded or bonded to at least one of those plates, and the outer installation flange 85 is welded or bonded to the floor panel 43.

The bottom wall 87 of the reinforcement member 82 is overlapped on the installation portion 69 of the casing 39, and a third bore 88 is formed on the bottom wall 87. The weld nut 72 is welded on a top surface of the bottom wall 87 of the reinforcement member 82 around the third bore 88. In order to integrate the lid 41, the casing 39 and the reinforcement member 82, the bolt 71 is screwed into the second bore 70, the third bore 88, and the weld nut 72.

In order to transmit the impact transmitted from the left side sill 25 to the battery packs 16 to 20, a second transmission member 93 is interposed between the inner sidewall 83 and the outer sidewall 84 of the reinforcement member 82. Specifically, an inner side end 95 of the second transmission member 93 is bent downwardly to form an inner installation flange 97, and an outer side end 94 of the second transmission member 93 is also bent downwardly to form an outer installation flange 96. The inner installation flange 97 is welded or bonded to the inner sidewall 83 within the height "h" of the battery packs 16 to 20, and the outer installation flange 96 is welded or bonded to the outer sidewall 84 within the height "h" of the battery packs 16 to 20. According to the fourth example, the first transmission member 60 and the second transmission member 93 may also be formed of iron or carbon fiber reinforced plastic material (CFRP).

Thus, the inner side end 95 and the outer side end 94 of the second transmission member 93 are situated at a substantially same level within the height "h" of the battery packs 16 to 20. Specifically, the inner side end 95 and the outer side end 94 of the second transmission member 93 are situated at a substantially same level with the inner side end 66 of the first transmission member 60. Optionally, the inner side end 95 and the outer side end 94 of the second transmission member 93 may also be situated at different level within the height "h" of the battery packs 16 to 20.

According to the fourth example, the collision impact applied to the portion of the left side sill 25 above the battery packs 16 to 20 is transmitted to the battery packs 16 to 20 through the first transmission member 60 and the second transmission member 93. In addition, since the reinforcement member 82 is interposed between the left side sill 25 and the casing 39, rigidity of the vehicle body against the collision impact applied from the side of the vehicle body may be further enhanced. Here, the structures of the left side sill according to the foregoing examples may also be applied to the right side sill 24.

Although the above exemplary embodiments of the present application have been described, it will be understood by those skilled in the art that the present application should not be limited to the described exemplary embodiments, and various changes and modifications can be made within the spirit and scope of the present disclosure. For example, the outer side end 65 of the first transmission member 60 may be situated higher than the upper end of the height "h" of the battery pack, and the inner side end 66 of the first transmission member 60 may be situated lower than the lower end of the height "h" of the battery pack. In this case, the inner side end 66 is adjusted in such a manner as to reduce a distance between the inner side end 66 and the lower end of the height "h" to be shorter than a distance between the outer side end 65 and the upper end of the height "h". In this case, the collision impact applied to the side sill is transmitted to a portion of the battery pack in the vicinity of the bottom thereof below the lower end of the height "h" of the battery pack. That is, since the distance between the inner side end 66 and the lower end of the height "h" is shorter than the distance between the outer side end 65 and the upper end of the height "h", the rigidity of the inner side end 66 may be enhanced higher than that of the outer side end 65. In this case, therefore, the collision impact applied to the portion of the side sill above the battery packs may be transmitted to the inner side end 66 situated close to the bottom of the battery pack to enhance the rigidity thereof, and the collision impact is further transmitted to the battery packs serving as the reinforcement members. For this reason, the rigidity of the vehicle body against the collision impact applied from the side of the vehicle may be further enhanced.

In addition, in order to reduce the vehicle weight, the transmission member may be divided into a plurality of pieces, and arranged at predetermined interval in the longitudinal direction of the vehicle. Further, a thickness of the transmission member may be altered according to need in such a manner that the side end thereof is situated at a same level or higher than the upper end of the battery pack or at a same level or lower than the lower end of the battery pack. Furthermore, the side sills of different examples may be employed as the right side sill and the left side sill.

What is claimed is:

1. A battery mounting structure for a vehicle, comprising:
a pair of hollow frame members extending in a longitudinal direction of the vehicle; and
a battery pack disposed between the frame members, wherein the battery pack includes an all-solid battery having a solid electrolyte,
each of the frame members includes an inner sidewall and an outer sidewall opposed to each other,
a portion of each respective inner sidewall overlaps with the battery pack within a height range of the battery pack,
each respective outer sidewall includes at least one of: a portion extending higher than an upper end of the height range of the battery pack and a portion extending lower than a lower end of the height range of the battery pack,
each respective outer sidewall is connected to the respective inner sidewall through a first load transmission member which transmits a load from the respective inner sidewall to the battery pack,
the first load transmission member includes an outer side end attached to the outer sidewall and an inner side end attached to the inner sidewall,
the outer side end of the first load transmission member is situated at a level above the height range of the battery pack,
the inner side end of the first load transmission member is attached to the inner sidewall at a level within the height range of the battery pack, or at a level that is a predetermined distance above the height range of the battery pack, and
a distance between the inner side end of the first load transmission member and the height range of the battery pack in the vertical direction is less than a distance between the outer side end of the first load transmission member and the height range of the battery pack in the vertical direction.

2. The battery mounting structure for the vehicle as claimed in claim 1,
wherein the battery pack includes a cell stack formed of a plurality of single cells, and
wherein the cell stack is disposed between the frame member in such a manner that the single cells are juxtaposed in a width direction of the vehicle.

3. The battery mounting structure for the vehicle as claimed in claim 1, wherein the inner side end of the first load transmission member is situated at a level within the height range of the battery pack, the battery mounting structure further comprises a second load transmission member that transmits a load from the inner sidewall to the battery pack, and the second load transmission member includes an inner side end and an outer side end, and the outer side end of the second load transmission member is situated at a level opposed to the inner side end of the first load transmission member, and the inner side end of the second load transmission member is situated at a level within the height range of the battery pack.

4. The battery mounting structure for the vehicle as claimed in claim 3, wherein the first load transmission member is formed integrally with the respective frame member.

5. The battery mounting structure for the vehicle as claimed in claim 3, wherein the first load transmission member is formed separately from the respective frame member, and the outer side end of the first load transmission member is attached to an inner surface of the outer sidewall and the inner side end of the first load transmission member is attached to an inner surface of the inner sidewall.

* * * * *